July 6, 1926.  
W. ZIPPER  
1,591,111  
RIM WITH REMOVABLE FLANGES FOR AUTOMOBILE VEHICLES AND THE LIKE  
Original Filed Dec. 12, 1924
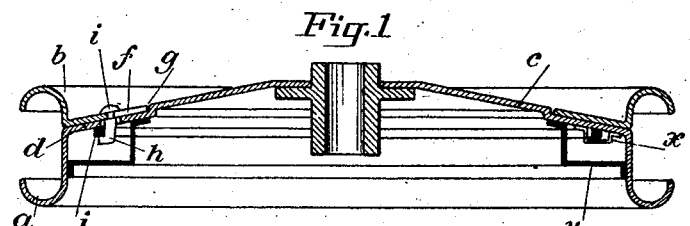
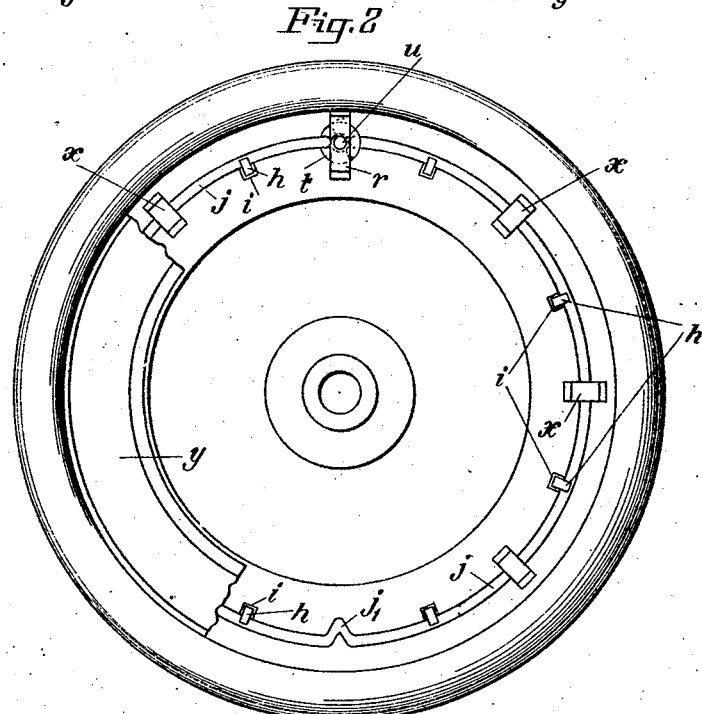
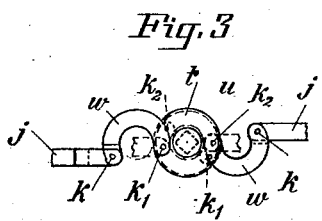
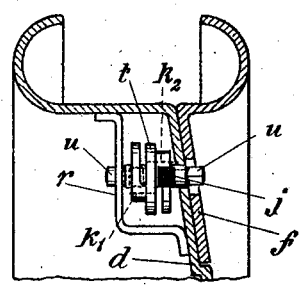
INVENTOR
W. Zipper
By Marks & Clark
attys Patented July 6, 1926.

UNITED STATES PATENT OFFICE.

WALTER ZIPPER, OF VIENNA, AUSTRIA.

RIM WITH REMOVABLE FLANGES FOR AUTOMOBILE VEHICLES AND THE LIKE.

Original application filed December 12, 1924, Serial No. 755,525, and in Austria April 14, 1924. Divided and this application filed September 4, 1925. Serial No. 54,571.

This invention relates to a rim with a detachable flange for the wheels of automobile vehicles and the like, wherein the connecting organs that hold together the two parts of the rim are locked and released by means of a single locking organ, and the connecting organs for the rim parts form open hooks.

According to the invention the locking organ for all the connecting hooks consists of an open resilient steel ring, the ends of which are connected by means of link rods to a rotatable disc provided with a pin or stud adapted to be engaged by a wrench, by rotating which the ends of the locking ring are moved nearer together or further apart, thereby moving the latter into or out of engagement with all the connecting hooks. The connecting and releasing of the rim parts are therefore as simple as the opening and closing of a lock.

This invention also renders it possible to arrange all the organs serving for the locking on the inner side of the wheel and only to have the member that actuates the locking organ projecting through the wheel to the outside, the said member being adapted to be engaged by a wrench or the like at its projecting end.

The accompanying drawing illustrates the invention as applied to a solid disc wheel, wherein one part of the rim is constructed as a projection from the wheel disc.

Figures 1 and 2 show in radial section and in elevation respectively one constructional form of the device for connecting the two parts of the rim with one another.

Figures 3 and 4 show a detail.

In the case of the constructional example illustrated, the non-removable wider rim part $a$ is made in one piece with a solid disc wheel $c$. The removable rim part $b$ is provided with a ring flange $f$, which is parallel to the outer part $d$ of the solid disc $c$ and lies in an annular joggled part of the disc $c$. With its inner edge the rim part $b$ bears against an annular step $g$ on the solid disc $c$.

To the detachable rim part $b$ are secured open hooks $h$, which are arranged in a circle, and which project through holes $i$ in the part $d$ to the inner side of the wheel. As an abutment for the hook $h$ there serves an open resilient steel ring $j$, which is located on the inner side of the wheel, and the diameter of which can be altered by increasing and diminishing the distance between its ends. When the ring $j$ is adjusted to its smaller diameter, the steel ring $j$ engages under the shoulders of all the connecting hooks $h$ and forms an abutment for them. When the diameter of the steel ring $j$ is forcibly increased, for changing a tyre, it releases the connecting hooks $h$ and the rim part $b$ can be simply removed.

For connecting the ends of the steel ring $j$ there serves a self-locking fastening, which is illustrated on a larger scale in Figures 3 and 4. This fastening consists of a small disc $t$ arranged on the inner side of the wheel, the pivot $u$ of the disc being journalled in the wheel-rim part $d$ and in a riveted plate or gusset $r$ (Figure 4). The end of this pivot $u$ projecting through an aperture in the detachable rim part $f$ to the outer side of the wheel is made rectangular, so that the disc $t$ can be rotated by means of a box spanner or socket wrench. With the disc $t$ are connected by means of two bolts $k_1, k_2$, two curved links $w$, the ends of which are connected by means of bolts $k$ with the ends of the steel ring $j$.

If the disc $t$ is rotated in the direction of the arrow (Figure 3) through somewhat more than 180°, so that the bolts $k_1$ and $k_2$ take up the positions $k_1$ and $k_2$ indicated by dotted lead lines, the bolts $k_1$ and $k_2$, by means of the two rods $w$, cause the ends of the steel ring $j$ to approach one another, by which means the ring $j$ comes into engagement with the hooks $h$. In the locked position ($k_1$ and $k_2$ shown in dotted lines) the bolts $k_1$ and $k_2$ have passed beyond the middle line of the ring $j$ and the rods $w$ bear with their inner surfaces against the pivot of the disc $t$, by which means any further rotation in the direction of the arrow is prevented.

The pull exerted by the resilient ring $j$ in the tangential direction holds the rods $w$ fast in the locked position. Self-locking fastenings of this kind are known in themselves.

In order that when the connection between the rim parts $a$ and $b$ is being released the steel ring $j$ may be certain to pass out of all the connecting hooks it is provided at about the middle with a flexure or bent-in part $j_1$ (Figure 2). This bent-in part causes the ring $j$ to spring outwards equally in all directions, when the distance between its ends is increased.

During the removal of the rim-part $b$ in order to prevent the resilient ring $j$, which during the releasing of the connection no longer lies in the hooks $h$, from coming away from the wheel $c$, a U-shaped plate or shackle $x$ (Figures 1 and 2) is riveted to the part $d$ between each two of the hooks $h$. These shackle plates permit an expansion of the ring $j$ but prevent it from coming away from the wheel. The outer ends of these shackle plates $x$ at the same time limit the expansion of the ring $j$, so that it must pass equally out of all the hooks $h$ when the connection is released.

Over the ring $j$, the shackle plates $x$ and the hooks $h$, and also over the hook illustrated in Figures 3 and 4, a thin, annular protecting sheet $y$ (Figure 1) is riveted, so that all the parts are protected from dust and water.

When detaching and connecting the rim parts $a$ and $b$, therefore, no operation is necessary other than the rotating of the pin $u$ through about 180 degrees. This operation does not have to overcome any appreciable resistance, because there is no friction worth mentioning, and mud does not hinder the steel ring $j$ from moving out of the hooks $h$. On the outside of the wheel there is nothing to be seen except the end of the actuating pin $u$.

What I claim is:—

1. A rim having a removable flange for the wheels of automobile vehicles and the like, comprising open hooks for connecting the rim parts, an open resilient locking ring, a rotatable disc, link rods for connecting the ends of said open ring with said rotatable disc, and means provided on said disc for engaging a wrench, the ends of the locking ring being adapted to be moved nearer together or further apart by the rotation of said disc, whereby the locking ring is moved into and out of engagement with all the connecting hooks.

2. A rim having a removable flange for wheels for automobiles and the like comprising open hooks for connecting the rim part and the flange, a resilient locking ring, means for contracting said ring into said hooks to lock said flange to said ring, said locking means being placed in a guarded position.

3. A rim having a removable flange for wheels of automobile vehicles and the like comprising open hooks for connecting the rim parts, a resilient locking ring, a rotatable disk, a curved rod connected to said disk and to one end of said resilient ring, a pin, means for rotating said disk whereby said link is moved over said pin to contract and lock said ring, said link being so constructed that when it is in the locked position it is off-center whereby said ring is securely locked against tension.

In testimony whereof I have signed my name to this specification.

WALTER ZIPPER.